US012609382B2

(12) United States Patent
    Liang et al.

(10) Patent No.: US 12,609,382 B2
(45) Date of Patent: Apr. 21, 2026

(54) SECONDARY BATTERY AND TOP COVER COMPONENT THEREOF

(71) Applicant: CONTEMPORARY AMPEREX TECHNOLOGY (HONG KONG) LIMITED, Hong Kong (CN)

(72) Inventors: Chengdu Liang, Ningde City (CN); Kai Wu, Ningde City (CN); Baisong Chen, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 265 days.

(21) Appl. No.: 16/574,966

(22) Filed: Sep. 18, 2019

(65) Prior Publication Data

US 2020/0328384 A1 Oct. 15, 2020

(30) Foreign Application Priority Data

Apr. 9, 2019 (CN) .......................... 201910280648.1

(51) Int. Cl.
    *H01M 2/04* (2006.01)
    *H01M 2/06* (2006.01)
    (Continued)

(52) U.S. Cl.
    CPC ....... *H01M 50/147* (2021.01); *H01M 50/176* (2021.01); *H01M 50/188* (2021.01);
    (Continued)

(58) Field of Classification Search
    CPC ............. H01M 50/103; H01M 50/183; H01M 50/184; H01M 50/186; H01M 50/188;
    (Continued)

(56) References Cited

U.S. PATENT DOCUMENTS

2003/0194609 A1* 10/2003 Nam .................... H01M 50/147
                                                        429/174
2007/0232123 A1 10/2007 Uh
                    (Continued)

FOREIGN PATENT DOCUMENTS

CN        207233789 U      4/2018
CN        108232052 A      6/2018
                    (Continued)

OTHER PUBLICATIONS

Minagata et al; "Power Storage Device Provided With Current Interrupter"; Machine translation of WO2016042940A1 obtained from WIPO IP Portal (Year: 2015).*

(Continued)

*Primary Examiner* — Allison Bourke
*Assistant Examiner* — Charlene Bermudez
(74) *Attorney, Agent, or Firm* — Andrew M. Calderon; Calderon Safran & Wright P.C.

(57) ABSTRACT

The present disclosure relate to the technical field of secondary batteries, and in particular, to a secondary battery and a top cover component thereof. The top cover component provided by the present disclosure includes a top cover plate having an electrode lead-out hole, and a second sealing portion and a second insulating portion stretching into the electrode lead-out hole, and the second sealing portion and the second insulating portion are at least partially staggered to each other on the radial direction of the electrode lead-out hole and are at least partially overlapped on the height direction. Based on this, a direct discharge clearance can be effectively blocked, and the creepage distance can be prolonged, thereby being conducive to reducing the risk of on fire or explosion and other problems of the secondary battery while withstanding a high voltage.

20 Claims, 4 Drawing Sheets

(51) Int. Cl.

| | |
|---|---|
| *H01M 2/30* | (2006.01) |
| *H01M 2/34* | (2006.01) |
| *H01M 50/147* | (2021.01) |
| *H01M 50/176* | (2021.01) |
| *H01M 50/188* | (2021.01) |
| *H01M 50/553* | (2021.01) |
| *H01M 50/583* | (2021.01) |
| *H01M 50/55* | (2021.01) |

(52) U.S. Cl.
CPC ....... *H01M 50/553* (2021.01); *H01M 50/583* (2021.01); *H01M 50/55* (2021.01)

(58) Field of Classification Search
CPC .. H01M 50/10; H01M 50/543; H01M 50/545; H01M 50/548; H01M 50/147; H01M 50/15; H01M 50/148; H01M 50/169; H01M 50/1243; H01M 50/553; H01M 50/176; H01M 50/143; H01M 50/55; H01M 50/555; H01M 50/531; H01M 50/538; H01M 50/54; H01M 50/533; H01M 50/557
See application file for complete search history.

(56) References Cited

U.S. PATENT DOCUMENTS

| | | | | |
|---|---|---|---|---|
| 2012/0058390 A1* | 3/2012 | Obayashi | ............ | H01M 50/553 |
| | | | | 29/877 |
| 2012/0064394 A1* | 3/2012 | Kim | .................... | H01M 50/103 |
| | | | | 429/181 |
| 2012/0141845 A1* | 6/2012 | Byun | .................. | H01M 50/528 |
| | | | | 429/61 |
| 2012/0258340 A1 | 10/2012 | Park et al. | | |
| 2013/0004832 A1* | 1/2013 | Kim | .................... | H01M 50/183 |
| | | | | 429/179 |

| | | | | |
|---|---|---|---|---|
| 2014/0106210 A1* | 4/2014 | Deng | .................. | H01M 50/186 |
| | | | | 429/179 |
| 2015/0140417 A1* | 5/2015 | Matsumoto | ......... | H01M 50/169 |
| | | | | 429/179 |
| 2018/0138465 A1 | 5/2018 | Yang et al. | | |
| 2018/0166666 A1 | 6/2018 | Chen et al. | | |
| 2019/0027717 A1 | 1/2019 | Chen et al. | | |
| 2019/0067649 A1 | 2/2019 | Li et al. | | |
| 2019/0067663 A1 | 2/2019 | Li et al. | | |

FOREIGN PATENT DOCUMENTS

| | | | | |
|---|---|---|---|---|
| CN | 108428822 A | 8/2018 | | |
| CN | 108428823 A | 8/2018 | | |
| CN | 108428824 A | 8/2018 | | |
| CN | 109285974 A | 1/2019 | | |
| CN | 110176557 A | 8/2019 | | |
| CN | 209658242 U | 11/2019 | | |
| EP | 2 846 378 A1 | 3/2015 | | |
| EP | 3 331 051 A1 | 6/2018 | | |
| EP | 3 451 410 A1 | 6/2019 | | |
| EP | 3 451 411 A1 | 6/2019 | | |
| WO | WO-2016042940 A1 * | 3/2016 | .......... | H01M 50/176 |
| WO | 2019051630 A1 | 3/2019 | | |

OTHER PUBLICATIONS

Extended European Search Report for European Application No. 19189288.4, European Patent Office, Munich, Germany, mailed Mar. 31, 2020, 5 pages.

International Search Report and Written Opinion of the International Searching Authority in related International Application No. PCT/CN2020/083505 mailed May 27, 2020, 17 pages.

Notice Of Allowance Chinese Patent Application No. 2019102806481, mailed Jan. 11, 2024.

* cited by examiner

100

SECONDARY BATTERY AND TOP COVER COMPONENT THEREOF

RELATED APPLICATION

The present application claims priority from Chinese application number CN201910280648.1 filed Apr. 9, 2019, which is herein incorporated by reference.

FIELD OF THE INVENTION

The present disclosure relates to the technical field of secondary batteries, and in particular, to a secondary battery and a top cover component thereof.

BACKGROUND OF THE INVENTION

Secondary batteries such as lithium ion batteries have been widely used in electric vehicles because of the advantages of high energy density, high power density, high number of cycles, and long storage time and the like. At present, the voltage of a whole vehicle system is about 300V-900V, in the case of abnormality of a battery cell, an internal circuit is disconnected or a Fuse (a fuse structure) is disconnected, at this time, the battery cell withstands a reverse high voltage of the system, however, since the safety distance in the existing secondary battery is not enough, the battery cell withstanding the reverse high voltage has a safety risk such as one fire or explosion or the like.

SUMMARY OF THE INVENTION

One technical problem to be solved by the present disclosure is to reduce the risk of problems such as on fire or explosion or the like when a secondary battery withstands a high voltage.

In order to solve the above technical problem, a first aspect of the present disclosure provides a top cover component of a secondary battery, including:

a top cover plate having a thickness of 0.01 mm to 10 cm and having an electrode lead-out hole;

a lower insulating member having a first insulating portion and a second insulating portion connected to each other, wherein the first insulating portion is located below the top cover plate, and the second insulating portion extends upward from the first insulating portion and is at least partially located in the electrode lead-out hole; and a sealing member having a first sealing portion and a second sealing portion connected to each other, wherein the first sealing portion is located on an upper surface of the top cover plate, the second sealing portion extends downward from the first sealing portion and is at least partially located in the electrode lead-out hole, and the second sealing portion and the second insulating portion are at least partially staggered to each other on the radial direction of the electrode lead-out hole and are at least partially overlapped on the height direction.

In some embodiments, at least a part of the second sealing portion is located between the second insulating portion and an inner wall of the electrode lead-out hole.

In some embodiments, the second insulating portion includes a covering portion, a surface of the covering portion close to the second sealing portion is substantially parallel to a surface of the second sealing portion close to the second insulating portion, and the surface of the covering portion close to the second sealing portion is covered on at least a part of the surface of the second sealing portion close to the second insulating portion.

In some embodiments, a top end of the second insulating portion is higher than a part of an upper surface of the top cover plate in contact with the first sealing portion, or, the top end of the second insulating portion is flush with or lower than the part of the upper surface of the top cover plate in contact with the first sealing portion.

In some embodiments, the top cover component further includes a terminal plate, the terminal plate is located above the first sealing portion and covers the electrode lead-out hole, and there is an interval between the top end of the second insulating portion and a lower surface of the terminal plate.

In some embodiments, the lower portion of the second sealing portion is in sealing fit with the lower insulating member.

In some embodiments, the lower portion of the second sealing portion is in interference fit with the lower insulating member.

In some embodiments, the lower insulating member further includes a sealing fit portion; the sealing fit portion protrudes from at least one of the upper surface of the first insulating portion or the upper surface of the second insulating portion or depresses downward from at least one of the upper surface of the first insulating portion or the upper surface of the second insulating portion; and the lower portion of the second sealing portion is in sealing fit with the sealing fit portion.

In some embodiments, the sealing fit portion is disposed at a joint of the first insulating portion and the second insulating portion, or, the sealing fit portion is disposed at the top end of the second insulating portion.

In some embodiments, the sealing fit portion includes a boss protruding from at least one of the upper surface of the first insulating portion or the upper surface of the second insulating portion, and the longitudinal cross section of the boss is triangular, fan-shaped, trapezoidal or rectangular.

In some embodiments, the surface of the sealing fit portion that is in contact with the second sealing portion inclines along a direction from bottom to top toward a direction close to the central axis of the electrode lead-out hole.

In some embodiments, an included angle between the surface of the sealing fit portion that is in contact with the second sealing portion and the upper surface of the first insulating portion is in a range of 10-85°.

In some embodiments, the sealing fit portion is disposed at the top end of the second insulating portion and depresses downward from the upper surface of the second insulating portion.

In some embodiments, the sealing member further includes a third sealing portion, and the third sealing portion is located between the lower surface of the top cover plate and the upper surface of the first insulating portion; or, a groove is formed in the lower surface of the top cover plate, and a part of the first insulating portion is located in the groove.

In some embodiments, the lower insulating member further includes a supporting portion supporting the first insulating portion, the supporting portion is disposed on the lower surface of the first insulating portion and protrudes downward from the lower surface of the first insulating portion; or, the supporting portion is disposed on the upper surface of a tab connecting portion of a connecting plate of the secondary battery and extends upward from the upper surface of the tab connecting portion.

In some embodiments, the height of the supporting portion is less than or equal to a height difference between the lower surface of the first insulating portion and the upper surface of the tab connecting portion.

In some embodiments, at least a part of the supporting portion is overlapped with the second sealing portion along the radial direction of the electrode lead-out hole.

A second aspect of the present disclosure further provides a secondary battery, including the top cover component of the present disclosure.

Since the sealing member has the second sealing portion extending into the electrode lead-out hole, and the second sealing portion and the second insulating portion of the lower insulating member extending into the electrode lead-out hole are at least partially staggered to each other on the radial direction of the electrode lead-out hole and are at least partially overlapped on the height direction, the creepage distance can be effectively prolonged, thereby being conducive to reducing the risk of the secondary battery of generating fire or explosion and other problems when withstanding a high voltage.

Other features and advantages of the present disclosure will become apparent from the detailed description of exemplary embodiments of the present disclosure with reference to drawings.

BRIEF DESCRIPTION OF THE ACCOMPANYING DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings can be obtained by those of ordinary skill in the art without any creative effort.

DETAILED DESCRIPTION OF THE PREFERRED EMBODIMENTS

Figure 1:
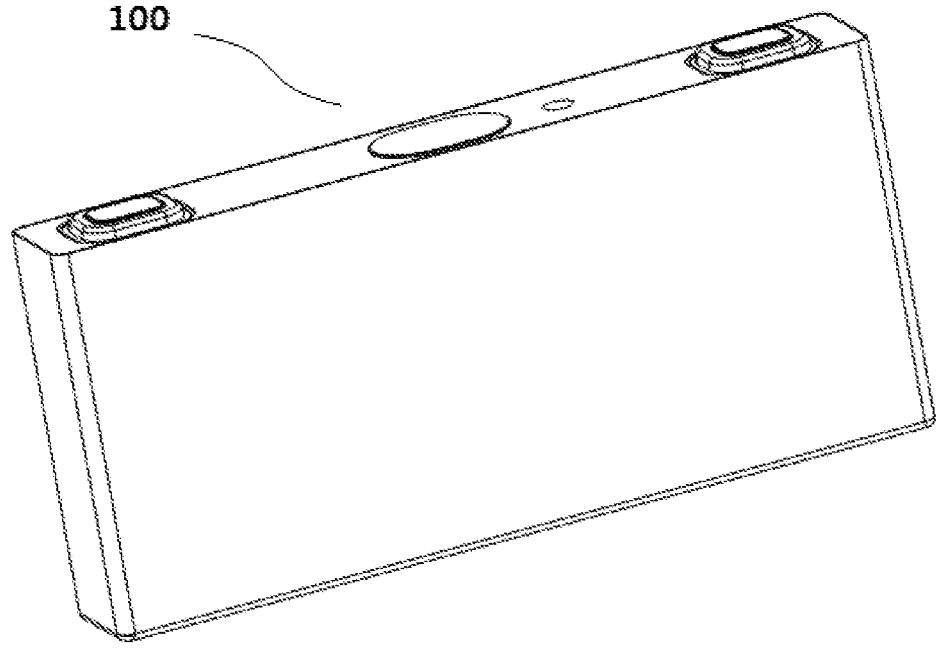
FIG. 1 shows a schematic diagram of an overall structure of a secondary battery of an embodiment of the present disclosure.

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. The following description of at least one exemplary embodiment is merely illustrative and is in no way used as any limitation of the present disclosure and the application or use thereof. All of other embodiments, obtained by those of ordinary skill in the art based on the embodiments of the present disclosure without any creative effort, fall into the protection scope of the present disclosure.

Techniques, methods and devices known to those of ordinary skill in related art can not be discussed in detail, but where appropriate, the techniques, methods and devices should be considered as a part of the authorized specification.

In the description of the present disclosure, it should be understood that orientation or position relationships indicated by orientation words such as "front, back, upper, lower, left and right", "transverse, longitudinal, vertical, horizontal" and "top, bottom" and the like are generally orientation or position relationships shown in the drawings, and are merely for the convenience of describing the present disclosure and simplifying the description, and on the absence of contrary illustration, these orientation words do not indicate or imply the referred apparatuses or elements must have specific orientations or are constructed and operated in specific orientations, and thus cannot be construed as limiting the protection scope of the present disclosure; and the orientation words "inside and outside" refer to the inside and outside of the contours of the components themselves.

In the description of the present disclosure, it should be understood that the words "first", "second" and the like are configured to defining parts and components, and are merely for the convenience of distinguishing the corresponding parts and components, and the above words have no special meaning, unless otherwise specified, and thus cannot be construed as limiting the protection scope of the present disclosure.

In addition, the technical features involved in different embodiments of the present disclosure described below can be combined with each other as long as they do not constitute conflicts with each other.

In a secondary battery, a top cover component covers a top opening of a shell to provide a sealed space for an electrode component and electrolyte in the shell, and the electric energy of the electrode component is conducted to the outside by an electrode terminal (a terminal plate or a pole column) of the top cover component.

As a structural form of the top cover component, the top cover component includes a top cover plate, a terminal plate serving as an electrode terminal, a lower insulating member and a sealing member. An electrode lead-out hole is formed in the top cover plate, the terminal plate is disposed above the top cover plate and covers the electrode lead-out hole. The lower insulating member is disposed below the top cover plate and is configured to realize the insulation between the top cover plate and a connecting plate (the connecting plate is configured to electrically connect a tab with the terminal plate) of the secondary battery and the insulation between the top cover plate and the electrode component. The sealing member is disposed between the top cover plate and the terminal plate for sealing.

In the process of forming the present invention, the inventors have found that with respect to the above-mentioned top cover component, the sealing member is generally located at the outside the electrode lead-out hole, so that the creepage distance between the top cover plate and the terminal plate is relatively short, at the same time, the sealing effect of the sealing member is poor, electric clearances are generated among the top cover plate, the terminal plate and the connecting plate easily, furthermore, the electrolyte on the creep path is more, and the resistance is smaller, and these factors are one of the important reasons causing the high-voltage discharge of the secondary battery (a big fire and even explosion is even caused by a high voltage). The creepage distance refers to the shortest distance between two conductive components along the surface of a solid insulating material; and the electric clearance refers to the shortest distance between the two conductive components in the air. The longer the creepage distance is, and/or the greater the electric clearance is, the lower the risk of high-voltage discharge between electric conductors is.

In view of the above circumstances, the present disclosure improves the structure of the top cover component, and at least one of the effects of prolonging the creepage distance, increasing the electric clearances and increasing the resistance on the creepage distance are achieved based on the improved structure of the top cover component, and then the purpose of reducing the risk of high-voltage discharge of the secondary battery is achieved.

FIG. 1 to FIG. 8 illustrate several embodiments of the present disclosure.

Referring to FIG. 1 to FIG. 8, a top cover component 10 of a secondary battery 100 provided by the present disclosure includes:

a top cover plate 1 having a thickness of 0.01 mm to 10 cm and having an electrode lead-out hole 11;

a lower insulating member 2 having a first insulating portion 21 and a second insulating portion 22 connected to each other, wherein the first insulating portion 21 is located below the top cover plate 1, the second insulating portion 22 extends upward from the first insulating portion 21, and at least a part of the second insulating portion 22 is located in the electrode lead-out hole 11; and a sealing member 3 having a first sealing portion 31 and a second sealing portion 32 connected to each other, wherein the first sealing portion 31 is located on an upper surface of the top cover plate 1, the second sealing portion 32 extends downward from the first sealing portion 31, at least a part of the second sealing portion 32 is located in the electrode lead-out hole 11, and the second sealing portion 32 and the second insulating portion 22 are at least partially staggered to each other on the radial direction of the electrode lead-out hole 11 and are at least partially overlapped on the height direction.

Since the sealing member 3 has the second sealing portion 32 extending into the electrode lead-out hole 11, and the second sealing portion 32 and the second insulating portion 22 of the lower insulating member 2 extending into the electrode lead-out hole 11 are at least partially staggered to each other on the radial direction of the electrode lead-out hole 11 and are at least partially overlapped on the height direction, the present disclosure can prolong the creepage distance between the top cover plate 1 and an electrode terminal, and this can reduce the risk of high-voltage discharge of the secondary battery 100.

Meanwhile, since the second sealing portion 32 and the second insulating portion 22 are at least partially staggered to each other on the radial direction of the electrode lead-out hole 11, compared with the situation that the second sealing portion 32 and the second insulating portion 22 are not staggered to each other but are aligned up and down on the radial direction of the electrode lead-out hole 11, a discharge clearance between the top cover plate 1 and a connecting plate 20 can be effectively blocked, which is also conducive to reducing the risk of high-voltage ignition or even explosion of the secondary battery 100. Blocking electric clearance means that the original continuous environmental medium (such as air or electrolyte) between two conductors is separated, so that the environmental medium is no longer continuous and the environmental medium between the two conductors can no longer be broken down. When the electric clearance is blocked, it can be considered that the electric clearance is increased to infinity.

In the present disclosure, when the second sealing portion 32 and the second insulating portion 22 are at least partially staggered to each other on the radial direction of the electrode lead-out hole 11, the second sealing portion 32 can be at least partially located on one side of the second insulating portion 22 close to the central axis of the electrode lead-out hole 11; or, the second sealing portion can also be at least partially located between the second insulating portion 22 and an inner wall of the electrode lead-out hole 11.

When at least a part of the second sealing portion 32 is located between the second insulating portion 22 and the inner wall of the electrode lead-out hole 11, the second insulating portion 22 can apply a better extrusion action to the second sealing portion 32 (i.e., apply an acting force along a direction from the central axis of the electrode lead-out hole 11 to the inner wall of the electrode lead-out hole 11). On this basis, the second sealing portion 32 can be more closely and reliably attached to the inner wall of the electrode lead-out hole 11, so that the sealing effect of the sealing member 3 can be improved, which is conducive to reducing the electrolyte on corresponding positions, increasing the resistance, reducing the current when the voltage is constant and reducing the risk of high-voltage discharge on one hand, and is conducive to more reliably blocking an electric clearance between the top cover plate 1 and the electrode terminal or the connecting plate, and reducing the risk of direct conduction between the top cover plate 1 and one of the electrode terminal or the connecting plate by the air on the other hand.

In addition, other measures can be taken by the present disclosure in order to improve the sealing effect.

As one of the other measures, the lower portion of the second sealing portion 32 and the lower insulating member 2 can be set to be in sealing fit with each other. In this way, by the sealing fit of the lower insulating member 2 and the second sealing portion 32, the sealing effect of the sealing member 3 can be improved, the electric clearance can be increased, and the electrolyte on the creep path can be reduced, thereby reducing the occurrence of a high-voltage discharge phenomenon.

The second sealing portion 32 can be in direct sealing fit with at least one of the first insulating portion 21 or the second insulating portion 22, but in order to achieve a better sealing fit effect, the lower insulating member 2 can further include a sealing fit portion 23, the sealing fit portion 23 protrudes from at least one of the upper surface of the first insulating portion 21 or the upper surface of the second insulating portion 22 or depresses downward from at least one of the upper surface of the first insulating portion 21 or the upper surface of the second insulating portion 22, and the lower portion of the second sealing portion 32 is in sealing fit with the sealing fit portion 23. By disposing the sealing fit portion 23 on at least one of the first insulating portion 21 or the second insulating portion 22, the sealing fit portion 23 that protrudes upward or depresses downward forms sealing fit with the lower portion of the second sealing portion 32, compared with the situation in which at least one of the first sealing portion 21 or the second insulating portion 22 is in direct sealing fit with the lower portion of the second sealing portion 32, the lower insulating member 2 can form tighter and more reliable sealing fit with the lower portion of the second sealing portion 32, and then the risk of high-voltage discharge and the like can also be reduced more effectively.

As a structural form of the sealing fit portion 23, the sealing fit portion 23 can include a boss protruding from at least one of the upper surface of the first insulating portion 21 or the upper surface of the second insulating portion 22, and the longitudinal cross section of the boss can be triangular, fan-shaped, trapezoidal or rectangular. The boss can be located only on the upper surface of the first insulating portion 21, or, can also be located at the joint of the first insulating portion 21 and the second insulating portion 22.

As another structural form of the sealing fit portion 23, the sealing fit portion 23 can be disposed at a top end of the second insulating portion 22 and depresses downward from the upper surface of the second insulating portion 22.

It can be seen that the specific arrangement position of the sealing fit portion 23 is not limited, and it can be located only on the first insulating portion 21, can also be located at the joint of the first insulating portion 21 and the second insulating portion 22, or can also be located only on the second insulating portion 22.

The surface of the sealing fit portion 23 of the present disclosure that is in contact with the second sealing portion 32 can be set to incline along a direction from bottom to top toward a direction close to the central axis of the electrode lead-out hole 11. On this basis, the sealing fit portion 23 can not only apply an upward acting force to the second sealing portion 32, but also can apply an acting force to the second sealing portion 32 along a direction from the central axis of the electrode lead-out hole 11 to the inner wall of the electrode lead-out hole 11, and can also play a certain guiding role on the second sealing portion 32 to guide the second sealing portion 32 to be close to one side of the inner wall of the electrode lead-out hole 11, so that a better sealing effect can be achieved, and the electric clearance can be blocked and the electrolyte on the creep path can be reduced more fully.

Moreover, in order to ensure tighter sealing between the lower portion of the second sealing portion 32 and the lower insulating member 2, the sealing fit between the lower portion of the second sealing portion 32 and the lower insulating member 2 can be further set as interference fit, for example, the lower portion of the second sealing portion 32 is in interference fit with the sealing fit portion 23. Since the contact between the lower insulating member 2 and the lower portion of the second sealing portion 32 is tighter in this case, the lower insulating member 2 can play a certain compression role (that is, apply a pressure upward) on the lower portion of the second sealing portion 32, so that the lower insulating member 2 and the second sealing portion 32 are in compression sealing with each other, accordingly, the electric clearance can be blocked and the electrolyte on the creep path can be reduced more effectively, and then the risk of the high-voltage discharge phenomenon is reduced more effectively.

As another of the other measures, the lower insulating member 2 can further include a supporting portion 24 supporting the first insulating portion 21. The supporting portion 24 is disposed on the lower surface of the first insulating portion 21 and protrudes downward from the lower surface of the first insulating portion 21, or, the supporting portion 24 is disposed on the upper surface of a tab connecting portion 201 of the connecting plate 20 and extends upward from the upper surface of the tab connecting portion 201. Since the supporting portion 24 can support the first insulating portion 21, so that the lower insulating member 2 can be effectively prevented from falling, thereby facilitating the closer contact between the lower insulating member 2 and the second sealing portion 32 and achieving a more reliable sealing effect.

The present disclosure will now be further described with reference to the various embodiments shown in FIG. 1 to FIG. 8.

Firstly, the first embodiment shown in FIG. 1 to FIG. 5 is described.

Figure 2:
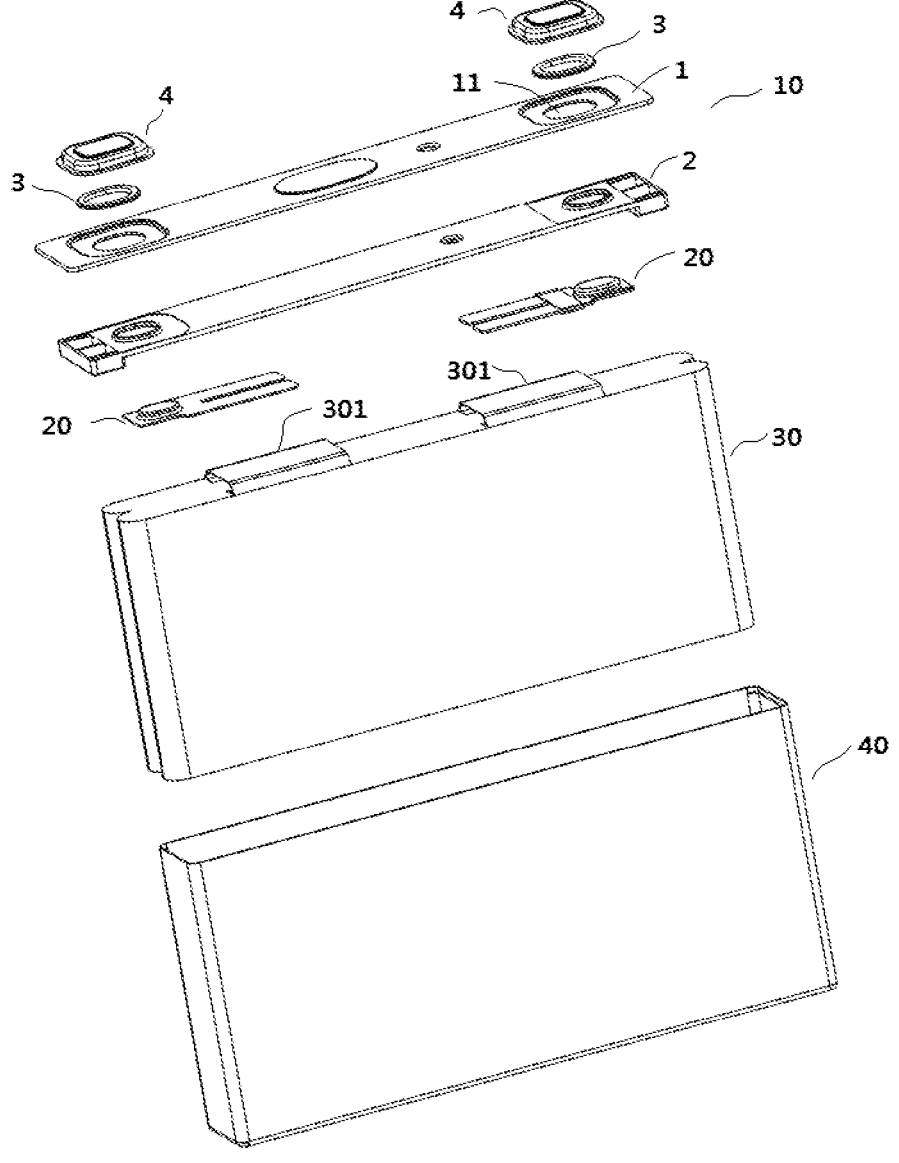
FIG. 2 shows an explosive view of FIG. 1.
Figure 3:
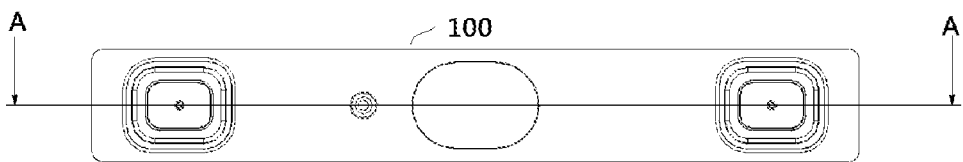
FIG. 3 shows a top view of FIG. 1.

As shown in FIG. 1 and FIG. 2, in the present embodiment, the secondary battery 100 includes a top cover component 10, a connecting plate 20, an electrode component 30, a shell 40, and the like.

It can be seen from FIG. 2 that the shell 40 has a hollow cavity therein and has a top opening for accommodating the electrode component 30 and the like. The shell 40 can be made of a metal material such as aluminum, an aluminum alloy or nickel plated steel, etc.

Figure 4:
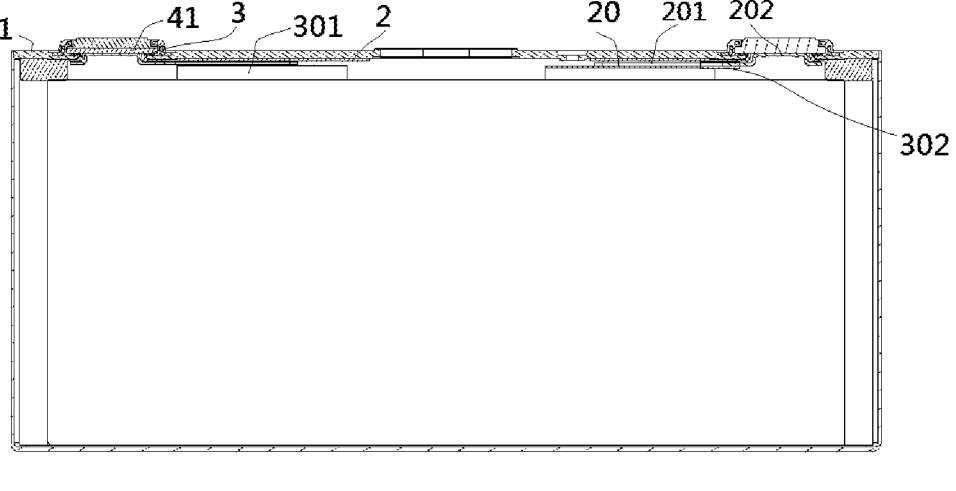
FIG. 4 shows an A-A section view of FIG. 3.

The electrode component 30 is a core component of the secondary battery 100, is accommodated in the hollow cavity in the shell 40 and is formed by stacking or winding a first pole piece, a second pole piece, and an insulating isolation piece located between the first pole piece and the second pole piece. One of the first pole piece and the second pole piece is used as a positive electrode piece and the other is used as a negative electrode piece, and the first pole piece and the second pole piece both have a coating portion coated with an active material and a tab 301 extending from the coating portion and coated with no active material. The electric energy generated by the electrode component 30 is conducted outward via the tab 301. The tab 301 corresponding to the positive electrode piece can be referred to as a positive electrode tab (one tab 301 located a right side in the figures), and the tab 301 corresponding to the negative electrode piece is referred to as a negative electrode tab (one tab 301 located a left side in the figures). Moreover, as shown in FIG. 4, a Fuse (fuse structure, generally a hole) is further disposed on the connecting plate 20 corresponding to the positive electrode tab, and a plastic part 302 is further sleeved on the portion of the connecting plate 20 provided with the Fuse. The Fuse can be fused to cut off the circuit when the current is too large, and the plastic part 302 can prevent the Fuse from being re-lapped after being fused, thereby achieving a safety protection function.

The top cover component 10 covers the top opening of the shell 40 for sealing the hollow cavity in the shell 40 so as to seal the electrode component 30 in the shell 40 and for conducting the electric energy generated by the electrode component 30 to the outside of the shell. As shown in FIG. 2, in the present embodiment, the top cover component 10 includes a top cover plate 1, an electrode terminal component 4, a sealing member 3, and a lower insulating member 2.

The top cover plate 1 covers the top opening of the shell 40 and provides a mounting base for the electrode terminal component 4, the sealing member 3, the lower insulating member 2, and the like. As can be seen from FIG. 2, the top cover plate 1 in the present embodiment takes the shape of a thin plate and has a shape and a size adapted to match the top opening of the shell 40, so that the top cover plate 1 can be conveniently connected to the top opening of the shell 40 to seal the top opening of the shell 40. The top cover plate 1 is provided with an electrode lead-out hole 11, the electrode lead-out hole 11 is a through hole, so that the electrode terminal component 4 can be conveniently connected with the tab 301 electrically, and the electric energy is conducted from the inside to the outside. Corresponding to the two tabs 301, the number of electrode lead-out holes 11 is also two, corresponding to the positive electrode tab and the negative electrode tab respectively.

The electrode terminal components 4, the sealing members 3 and the lower insulating members 2 are all disposed on the top cover plate 1, and corresponding to the two tabs 301, the numbers of the electrode terminal components 4, the sealing members 3 and the lower insulating members 2 are also two, wherein the electrode terminal component 4, the sealing component 3 and the lower insulating member 2 corresponding to the positive electrode tab form a group, the negative electrode terminal component 4, the sealing component 3 and the lower insulating member 2 corresponding to the negative electrode tab form another group. The two groups of structures are set to be the same to simplify the structures. Therefore, one group is mainly described below. If the two groups need to be mentioned, the two groups are named by adding "positive" and "negative" for the convenience of distinguishing.

The electrode terminal component 4 is disposed above the top cover plate 1 and is configured to electrically connect the tab 301. The electrode terminal component 4 includes an electrode terminal and a terminal fixing member, the electrode terminal is electrically connected with the tab 301, and the electrode terminal is connected with the top cover plate 1 via the terminal fixing member.

Figure 5:
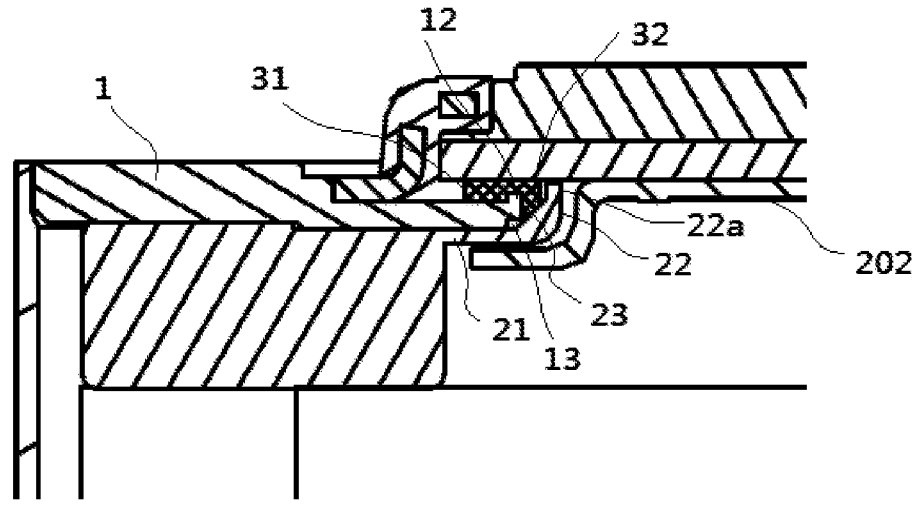
FIG. 5 shows a local amplification schematic diagram of FIG. 4.

Specifically, as shown in FIG. 4 and FIG. 5, in the present embodiment, the electrode terminal does not adopt a pole column structure that stretches into the shell 40, but adopts the structural form of a terminal plate 41. The terminal plate 41 covers the electrode lead-out hole 11 and is electrically connected with the tab 301 through the connecting plate 20. Since the terminal plate 41 is located at the outside of the electrode lead-out hole 11 compared with the pole column stretching into the shell 4 via the electrode lead-out hole 11, the internal space of the shell 4 does not need to be occupied, therefore the energy density of the secondary battery 100 can be effectively improved. The terminal plate 41 can be of a circular or square sheet or a thin plate-shaped structure. The terminal plate 41 corresponding to the positive electrode tab is referred to as a positive terminal plate, and the terminal plate corresponding to the negative electrode tab is referred to as a negative terminal plate.

In the present embodiment, the terminal plate 41 is electrically connected with the tab 301 via the connecting plate 20. The connecting plate 20 is disposed between the electrode component 30 and the top cover component 10 for electrically connecting the tab 301 and the terminal plate 41 to conduct the electric energy generated by the electrode component 30 to the terminal plate 41, thereby facilitating the terminal plate 41 to conduct the electric energy to the outside of the secondary battery 100. As can be seen from FIG. 2, in the present embodiment, the number of the connecting plates 20 is two, one connecting plate 20 is electrically connected with the positive electrode tab and the positive terminal plate, and the other connecting plate 20 is electrically connected with the negative electrode tab and the negative terminal plate.

In order to simplify the structure, in the present embodiment, the two connecting plates 20 adopt the same structure. As shown in FIG. 4 and FIG. 5, the connecting plate 20 of the present embodiment includes a tab connecting portion 201 and a terminal connecting portion 202, the tab connecting portion 201 is electrically connected with the tab 301, and the terminal connecting portion 202 is electrically connected with the terminal plate 41. The electric connection herein can be realized, for example, by soldering.

Furthermore, as can be seen by combing FIG. 4 and FIG. 5, in the present embodiment, the tab connecting portion 20 takes the shape of a plate and is substantially parallel to the top cover plate 1; and the terminal connecting portion 202 is connected with the tab connecting portion 201 and protrudes upward relative to the tab connecting portion 201, and the terminal connecting portion 202 stretches into the electrode lead-out hole 11 and is in contact with the terminal plate 41, so that the terminal connecting portion 202 can be conveniently welded with the terminal plate 41 located at the outside of the electrode lead-out hole 11 to realize the electric connection between the terminal connecting portion 202 and the terminal plate 41. The terminal connecting portion 202 can have a cylindrical convex hull structure, which can be formed by stamping the connecting plate 20.

The sealing member 3 is disposed between the top cover plate 1 and the terminal plate 41 for sealing the electrolyte or the like to prevent leakage of the electrolyte or the like so as to improve the reliability of use of the secondary battery 100. As shown in FIG. 5, in the present embodiment, the sealing member 3 includes a first sealing portion 31 and a second sealing portion 32, wherein the first sealing portion 31 is disposed on the upper surface of the top cover plate 1, that is, the first sealing portion 31 is located between the upper surface of the top cover plate 1 and the lower surface of the terminal plate 41, such that the terminal plate 41 can press the first sealing portion 31 against the upper surface of the top cover plate 1, so that a sealing line is formed between the terminal plate 41 and the top cover plate 1; and the second sealing portion 32 is connected with the first sealing portion 31 and extends downward from the first sealing portion 31 into the electrode lead-out hole 11. The sealing member 3 can adopt an annular structure on the whole, at this time, the first sealing portion 31 and the second sealing portion 32 are both annular and concentric with each other, and the second sealing portion 32 is located below the first sealing portion 31 and has an outer diameter size less than that of the first sealing portion 31.

In order to achieve stable arrangement of the sealing member 3, as shown in FIG. 5, in the present embodiment, a projection 12 protruding upward is arranged on the upper surface of the top cover plate 1 that is in contact with the first sealing portion 31, the projection 12 is clamped with the first sealing portion 31, thereby achieving the restriction of the first sealing portion 31, so that the sealing member 3 is more stably disposed on the upper surface of the top cover plate 1 and is unlikely to generate displacement on the radial direction of the electrode lead-out hole 11. The projection 12 can be formed by stamping, in this case, a groove 13 is formed at a position corresponding to the projection 12 on the lower surface of the top cover plate 1, and the groove 13 depresses upward from the lower surface of the top cover plate 1.

The structure of the above sealing member 3 is different from that of the existing sealing member. In the prior art, the sealing member also has the first sealing portion 31, but does not have the second sealing portion 32. In the present embodiment, the sealing member 3 is additionally provided with the second sealing portion 32, which has the advantage that the sealing member 3 can be conveniently matched with the top cover plate 1 and the lower insulating member 2 to prolong the creepage distance and improve the sealing effect, thereby solving the high-voltage discharge problem, and this will be explained in more detail in combination with the lower insulating member 2.

The lower insulating member 2 is configured to achieve the insulation between the top cover plate 1 and the electrode component 30 and the connecting plate 20, and is generally made of an insulating material such as plastic. As shown in FIG. 2, FIG. 4 and FIG. 5, the lower insulating member 2 of the present embodiment substantially takes the shape of a plate and includes a first insulating portion 21, a second insulating portion 22 and a sealing fit portion 23. The first insulating portion 21 is located below the top cover plate 1, the second insulating portion 22 is connected with the first insulating portion 21 and extends upward from the first insulating portion 21 into the electrode lead-out hole 11, and the sealing mating portion 23 is disposed at the joint of the first insulating portion 21 and the second insulating portion 22 and has a boss structure that protrudes upward from the upper surface of the first insulating portion 21. The second insulating portion 22 can be a hollow cylindrical protrusion disposed on the upper surface of the first insulating portion 21, and the sealing fit portion 23 can be an annular boss disposed around the root of the second insulating portion 22.

As shown in FIG. 5, in the present embodiment, the second insulating portion 22 is entirely located on the right side of the second sealing portion 32, the second insulating portion 22 extends upward to a higher position, and the top end thereof is located above the part of the upper surface of the top cover plate 1 that is in contact with the first sealing portion 31. Based on this, the second insulating portion 22 and the second sealing portion 32 are staggered on a left-right direction (i.e., the radial direction of the electrode lead-out hole 11), the second sealing portion 32 is entirely located between the second insulating portion 22 and the inner wall of the electrode lead-out hole 11, and second insulating portion 22 and the second sealing portion 32 are overlapped on the vertical direction.

Based on the above settings, the creepage distance between the top cover plate 1 and the terminal plate 41 is prolonged with respect to the absence of the second sealing portion 32. When the sealing member 3 does not have the second sealing portion 32, the creepage distance between the top cover plate 1 and the terminal plate 41 is only substantially equal to the height between the part of the upper surface of the top cover plate 1 that is in contact with the first sealing portion 31 and the lower surface of the terminal plate 41. In the present embodiment, the creep path between the top cover plate 1 and the terminal plate 41 extends to the lower surface of the terminal plate 41 along the upper surface of the first insulating portion 21 directly below the groove 13, the surface of the sealing fit portion 23 that is in contact with the second sealing portion 32 and the surface on one side of the second insulating portion 22 close to the central axis of the electrode lead-out hole 11, the creepage distance is obviously greater than the height between the part of the upper surface of the top cover plate 1 that is in contact with the first sealing portion 31 and the lower surface of the terminal plate 41, that is, the creepage distance when the sealing member 3 does not have the second sealing portion 32.

At the same time, compared with the situation in which the second insulating portion 22 and the second sealing portion 32 are disposed to be aligned to each other up and down (that is, the two portions are not staggered to each other on the radial direction of the electrode lead-out hole 11), the electric clearance between the top cover plate 1 and the connecting plate 20 can also be blocked by the above setting.

Moreover, since the second sealing portion 32 is entirely located between the second insulating portion 22 and the inner wall of the electrode lead-out hole 11, the second insulating portion 22 can extrude the entire second sealing portion 32 on a direction close to the inner wall of the electrode lead-out hole 11, so that the second sealing portion 32 is in contact with the inner wall of the electrode lead-out hole 11 more closely and more reliably, therefore, the sealing property can also be improved, the electrolyte on the creep path is reduced, the resistance is increased, and the potential safety hazards are reduced. At the same time, the second insulating portion 22 can protect the second sealing portion 32 to a certain extent to reduce the contact between the sealing member 3 and the electrolyte, so that the risk of swelling of the sealing member 3 under the action of the electrolyte can be reduced, which is conducive to prolonging the service life of the sealing member 3. The second insulating portion 22 is set to extend to the higher position, so that the second insulating portion 22 can apply an extrusion function and a protection function to more portions of the second sealing portion 22 on the height direction.

As shown in FIG. 5, the second insulating portion 22 located on the right side of the second sealing portion 32 of the present embodiment includes a covering portion 22a, and the covering portion 22a is located at the upper portion of the second insulating portion 22, is substantially parallel to the second sealing portion 32 on the whole and covers the surface of the second sealing portion 32. Since the disposed covering portion 22a can increase the sealing area of the second insulating portion 22 and the second sealing portion 32 and play a certain protection function on the portion of the second sealing portion 32 located at the upper portion, compared with the situation in which the covering portion 22a is not disposed, the sealing effect can be further improved, the potential safety hazards can be further effectively reduced, and the service life of the sealing member 3 can be prolonged.

It should be noted that the covering portion 22a is not limited to the illustrated structure described above, in fact, as long as the surface of the covering portion 22a close to the second sealing portion 32 is substantially parallel to the surface of the second insulating portion 22 close to the second insulating portion 22, and the surface of the covering portion 22a close to the second sealing portion 32 covers at least a part of surface of the second sealing portion 32 close to the second insulating portion 22.

In addition, in the present embodiment, the second insulating portion 22 upward extending is not in contact with the lower surface of the terminal plate 41, that is, there is an interval between the top end of the second insulating portion 22 (also the top end of the covering portion 22a) and the lower surface of the terminal plate 4, for example, the height h of the interval can be greater than or equal to 0.01 mm, and is less than or equal to the height difference between the portion of the lower surface of the top cover plate 1 that is in contact with the first sealing portion 31 and the lower surface of the terminal plate 41. Based on this, under the premise that the second insulating portion 22 effectively extrudes the second sealing portion 32, the second insulating portion 22 can be prevented from falling due to the pressing action of the terminal plate 41, which is conducive to better achieving the leftward compression action of the lower insulating member 2 on the sealing member and the upward compression action of the lower insulating member 2 on the sealing member 3 that is described below.

In the present embodiment, the second sealing portion 32 is in interference fit with the sealing fit portion 23 to achieve the upward compression action of the lower insulating member 2 on the sealing member 3. Specifically, as shown in FIG. 5, in the present embodiment, the sealing fit portion 23 is a boss disposed at the joint of the first insulating portion 21 and the second insulating portion 22 and has a triangular longitudinal cross section and an obliquely disposed surface in contact with the lower portion of the second sealing portion 32. For the convenience of description, the surface of the sealing fit portion 23 that is in contact with the lower portion of the second sealing portion 32 is referred to as an acting surface. As can be seen from FIG. 5, the acting surface abuts against the lower portion of the second sealing portion 32, and the two interfere with each other to form the interference fit, and the acting surface inclines along a direction from bottom to top toward the direction (rightward in FIG. 5) close to the central axis of the electrode lead-out hole 11.

Due to the interference fit between the sealing fit portion 23 and the lower portion of the second sealing portion 32, the sealing fit portion 23 is not only in contact with the lower portion of the second sealing portion 32, but also can apply the upward compression action to the second sealing portion 32, so that the sealing fit portion 23 and the lower portion of the second sealing portion 32 can form the sealing fit more tightly and reliably, accordingly, the sealing effect is better, the electric clearance can be blocked and the electrolyte on the creep path can be reduced more effectively, and the working safety of the secondary battery 100 can be improved more effectively.

Since the acting surface inclines along the direction from bottom to top toward the direction close to the central axis of the electrode lead-out hole 11, when the sealing fit portion 23 can apply an extrusion action to the second sealing portion 32 along the direction from the central axis of the electrode lead-out hole 11 to the inner wall of the electrode lead-out hole 11 while applying the upward compression action to the second sealing portion 32, in this way, the sealing fit portion 23 can apply leftward extrusion action to the second sealing portion 32 together with the covering portion 22a, thereby improving the extrusion acting fore of the lower insulating member 2 on the sealing member 3 and achieving a more sufficient and reliable sealing effect of the sealing member 3 on the electrode lead-out hole 11. Moreover, the acting surface obliquely disposed can also provide a certain guiding effect on the second sealing portion 32 to guide the second sealing portion 32 to squeeze into the groove 13 located on one side of the inner wall of the electrode lead-out hole 11. Since at least a part of the groove 13 can be filled by the sealing member 3, at least a part of the groove 13 is sealed, and the electrolyte in the groove 13 is reduced, that is, the electrolyte on the creep path is reduced, thereby further increasing the resistance and reducing the current at the same voltage, and accordingly the ignition or explosion safety risks are decreased.

An included angle between the acting surface and the upper surface of the first insulating portion 21 can be set in a range of 10-85° to reduce the occurrence possibility of a clearance between the lower insulating member 2 and the second sealing portion 32 while achieving good sealing, thereby blocking the discharge clearance between the top cover plate 1 and the connecting plate 20 is more reliable.

The first insulating portion 21, the second insulating portion 22 and the sealing fit portion 23 can be of an integrated structure or a split structure. In the present embodiment, the first insulating portion 21, the second insulating portion 22 and the sealing fit portion 23 are of the integrated structure.

In summary, the top cover component 10 of the embodiment shown in FIG. 1 to FIG. 5 has a longer creepage distance, and at the same time, the electrolyte on the creep path is less, and there is greater discharge clearance, there-fore, no ignition or even explosion problem is generated easily while withstanding a reverse high voltage, and accordingly the safety of use is higher.

Figure 6:
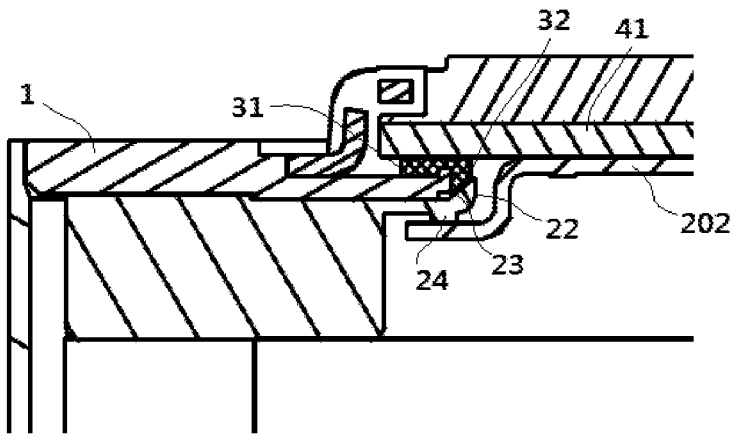
FIG. 6 shows a local amplification schematic diagram of another embodiment.
Figure 7:
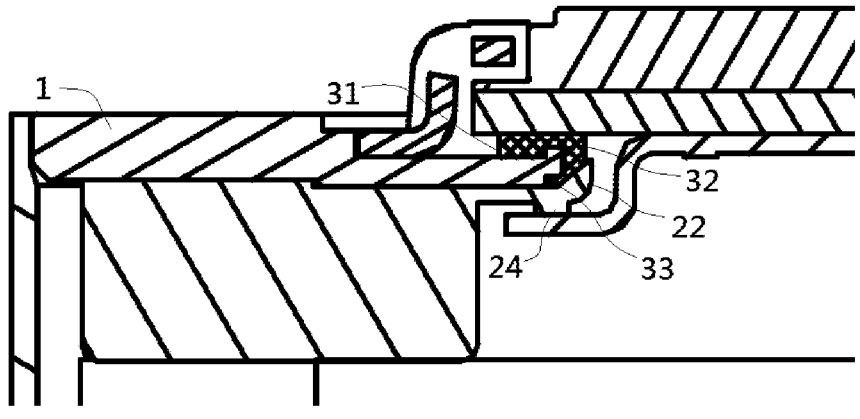
FIG. 7 shows a local amplification schematic diagram of yet another embodiment.
Figure 8:
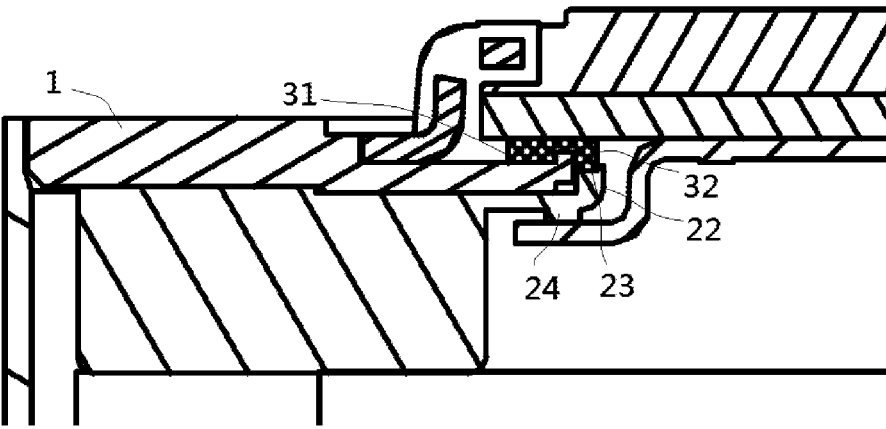
FIG. 8 shows a local amplification schematic diagram of yet another embodiment.

However, in order to improve the safety of use of the secondary battery 100, the structure of the top cover component 10 is not limited to what is shown in FIG. 5 described above. FIG. 6 to FIG. 8 show several of the other possible embodiments.

FIG. 6 to FIG. 8 can be seen as variations of the embodiment shown in FIG. 5, therefore, the portions the same as the FIG. 5 are not repeatedly described below, reference can be specifically made to the description of the embodiment shown in FIG. 5, and only the differences of the various embodiments are described with emphasis.

In the embodiment shown in FIG. 6, the top cover component 10 still includes the second sealing portion 32, the second insulating portion 22 and the sealing fit portion 23, and the sealing fit portion 23 still forms the interference fit with the lower portion of the second sealing portion 32 via the obliquely disposed acting force, the main difference with the embodiment shown in FIG. 5 mainly lies in that, on one hand, the second insulating portion 22 of the present embodiment no longer includes the covering portion 22a on the upper portion, but only includes a portion connected with the sealing fit portion 23 and located on the lower portion; and on the other hand, the lower insulating member 2 of the embodiment not only includes the first insulating portion 21, the second insulating portion 22 and the sealing fit portion 23, but also includes a supporting portion 24 disposed on the lower surface of the first insulating portion 21.

Specifically, as can be seen from FIG. 6, in the present embodiment, the second insulating portion 22 no longer includes the covering portion 22a and extends upward to a lower position, and the top end of which is located below a portion of the upper surface of the top cover plate 1 that is in contact with the first sealing portion 31. By setting the second insulating portion 22 to extend upward to the lower position, the occupation of the internal space of the electrode lead-out hole 11 by the second insulating portion 22 can be reduced, so that the second insulating portion 22 does not need to occupy the space of the upper portion of the electrode lead-out hole 11 anymore, since this can leave more space for the terminal connecting portion 202 located at the upper portion of the electrode lead-out hole 11, the terminal connecting portion 202 can be set to have a larger surface area, thereby facilitating the welding of the terminal connecting portion 202 and the terminal plate 41 at greater areas, therefore being conducive to increasing the welding area between the connecting plate 20 and the terminal plate 41, which can enhance the overcurrent capability and reduce the heat generation. In addition to be lower than the portion of the upper surface of the top cover plate 1 that is in contact with the first sealing portion 31, the top end of the second insulating portion 22 can be set to be flush with the portion of the upper surface of the top cover plate 1 that is in contact with the first sealing portion 31, and at this time, it also contributes to increasing the welding area between the terminal connecting portion 202 and the terminal plate 41.

Further, it can be seen by comparing FIG. 5 with FIG. 6 that, the difference between the second insulating portion 22 of the present embodiment and the second insulating portion 22 shown in FIG. 5 also lies in that the portion of the second insulating portion 22 of the second embodiment connected with the sealing fit portion 23 has a smaller width on the radial direction of the electrode lead-out hole 11, since the internal space of the electrode lead-out hole 11 occupied by the second insulating portion 22 can be reduced by this setting, it is also conducive to increasing the welding area between the connecting plate 20 and the terminal plate 41.

Meanwhile, as can be seen from FIG. 6, in the present embodiment, the supporting portion 24 is located between the first insulating portion 21 and the tab connecting portion 201 and protrudes downward from the lower surface of the first insulating portion 21 to support the first insulating portion 21. The height of the supporting portion 24 can be set to be less than or equal to the height difference between the lower surface of the first insulating portion 21 and the upper surface of the tab connecting portion 201.

In order to ensure good welding between the terminal connecting portion 202 and the terminal plate 41, the height of the connecting plate 20 is generally greater than the height difference between the terminal plate 41 and the lower surface of the top cover plate 1. And at the same time, due to the disposition of the plastic part 302 and the like, there is inevitably a clearance between the tab connecting portion 201 and the first insulating portion 21, and the present embodiment can effectively compensate for the clearance between the tab connecting portion 201 and the first insulating portion 21 by disposing the supporting portion 24 supported below the first insulating portion 21 and changes a cantilever structure of the second insulating portion 22, so that the lower insulating member 2 is unlikely to drop even under the downward pressure applied by the sealing member 3 or the like, this can improve the contact tightness between the lower insulating member 2 and the sealing member 3, facilitate the insulating member 2 to compress the sealing member 3 more reliably and more effectively block the electric clearance and reduce the electrolyte on the creep path. At the same time, the supporting portion 2 is disposed on the lower surface of the first insulating portion 21, so that the strength of the lower insulating member 2 can be improved to reduce the deformation of the lower insulating member 2 in production and carrying processes.

Furthermore, as can be seen from FIG. 6, in the present embodiment, a part of the supporting portion 24 is overlapped with the second sealing portion 32 along the radial direction (the left-right direction in FIG. 6) of the electrode lead-out hole 11, that is, a part of the supporting portion 24 is located directly below the second sealing portion 32, so that the supporting portion 24 can better withstand the downward pressure applied by the sealing member 3 to the lower insulating member 2, thereby more effectively maintaining the sealing state between the sealing member 3 and the lower insulating member 2.

It should be understood that the supporting portion 24 can be set as a full-circle annular downward protruding structure, or can be set to include at least two downward protruding portions spaced apart from each other. In addition, in addition to being disposed on the lower insulating member 2, the supporting portion 24 can also be disposed on the connecting plate 20, for example, the supporting portion 24 can be disposed on the upper surface of the tab connecting portion 201 and extends upward from the upper surface of the tab connecting portion 201, and the supporting portion 24 at this time can also support the lower insulating member 2, so that the lower insulating member 2 and the sealing member 3 are sealed more tightly and reliably.

The embodiment shown in FIG. 7 is a variation of the embodiment shown in FIG. 6. As shown in FIG. 7, the present embodiment is the same as the embodiment shown in FIG. 6, the second insulating portion 22 does not include the covering portion 22a, the lower insulating member 2 further includes the supporting portion 24, and the difference with the embodiment shown in FIG. 6 mainly lies in that, in the present embodiment, the sealing member 3 not only includes the first sealing portion 31 and the second sealing portion 32, but also includes a third sealing portion 33, the third sealing portion 33 is located between the lower surface of the top cover plate 1 and the upper surface of the first insulating portion 21. Specifically, as can be seen from FIG. 7, the third sealing portion 33 of the present embodiment is located in the groove 13 and fills the groove 13.

By filling the entire groove 13 with the third sealing portion 33 to form the sealing of the groove 13, the electrolyte in the groove 13 can be further reduced, and the safety of use of the secondary battery 100 can be more effectively improved.

Alternatively, the third sealing portion 33 can also fill only a part of the groove 13, or, the third sealing portion 33 can also be not disposed, so that a part of the first insulating portion 21 is located in the groove 13, at this time, since the part of the first insulating portion 21 located in the groove 13 fills the groove 13, the electrolyte in the groove 13 can also be reduced, thereby also being conducive to improving the safety of use of the secondary battery 100.

It can be seen from FIG. 5 to FIG. 7 that, in the foregoing three embodiments, the sealing fit portions 23 are respectively disposed at the joint of the first insulating portion 21 and the second insulating portion 22, and are all bosses having triangular longitudinal cross sections and have inclined acting surfaces, however, as a variation, the sealing fit portion 23 can also be disposed at the top end of the second insulating portion 22, or, the longitudinal cross section of the sealing fit portion 23 being the boss can also be rectangular, trapezoidal or fan-shaped or the like, or, the sealing fit portion 23 can no longer adopt the upward protruding boss structure, but adopt a downward depressing structural form.

FIG. 8 shows a variation embodiment. It can be seen from FIG. 8 that, in the present embodiment, the sealing fit portion 23 is no longer disposed at the joint of the first insulating portion 21 and the second insulating portion 22, but at the top end of the second insulating portion 22, and the sealing fit portion 23 does not protrude upward from the upper surface of the second insulating portion 22, but depresses downward from the upper surface of the second insulating portion 22.

By disposing the sealing fit portion 23 that depresses downward from the upper surface of the second insulating portion 22 at the top end of the second insulating portion 22, on one hand, the sealing fit portion 23 can still form the interference fit with the lower portion of the second sealing portion 32 conveniently and reliably, on the other hand, the top end of the second insulating portion 22 forms a stepped structure, and a portion of the stepped structure extending upward from the sealing fit portion 23 is coated on the surface of one side of the second sealing portion 32 close to the central axis of the electrode lead-out hole 11, which can play the role similar to that of the covering portion 22a shown in FIG. 5 to extrude the second sealing portion 32 on the inner wall of the electrode lead-out hole 11 to achieve a better sealing effect.

As described above, the top cover component 10 of the present disclosure can effectively reduce the risk of the high-voltage discharge phenomenon of the secondary battery 100, therefore, the top cover component is applied to the secondary battery 100 to effectively improve the use of safety of the secondary battery 100. Therefore, the present disclosure also provides a secondary battery 100 based on the top cover component 10 of the present disclosure. The secondary battery 100 can be particularly applied to an electric vehicle to effectively improve the performance of the electric vehicle by reducing the potential safety hazards caused by the reverse high voltage.

The above description is only exemplary embodiments of the present disclosure, and is not intended to limit the present disclosure. Any modifications, equivalent substitutions, improvements and the like made within the spirit and scope of the present disclosure should be included in the protection scope of the present disclosure.

The invention claimed is:

1. A top cover component of a secondary battery, comprising:

a top cover plate comprising an electrode lead-out hole;

a terminal plate;

a lower insulating member comprising a first insulating portion and a second insulating portion connected to each other, wherein the first insulating portion is located below the top cover plate, and the second insulating portion extends upward from the first insulating portion and is at least partially located in the electrode lead-out hole, wherein the lower insulating member is configured to realize electrical insulation between the top cover plate and a connecting plate and electrical insulation between the top cover plate and an electrode component of the secondary battery, and the connecting plate is configured to electrically connect a tab of the electrode component with the terminal plate; and a sealing member comprising a first sealing portion and a second sealing portion connected to each other, wherein the first sealing portion is located on an upper surface of the top cover plate, the top cover plate comprises a projection protruding upward arranged on the upper surface of the top cover plate that is in contact with the first sealing portion, a lower surface of the first sealing portion includes a groove, the projection is clamped with the first sealing portion and fits with the groove, a surface on one side of the projection close to a central axis of the electrode lead-out hole extends along the height direction and is flush with an inner wall of the electrode lead-out hole, the surface on one side of the projection close to a central axis of the electrode lead-out hole and a wall section of the inner wall of the electrode lead-out hole close to the projection form a vertically extending cylindrical surface, the second sealing portion extends downward from the first sealing portion, passes by the surface of the projection on one side close to the central axis of the electrode lead-out hole, and is at least partially located in the wall section of the electrode lead-out hole, and in the wall section of the electrode lead-out hole within the space defined by the cylindrical surface the second sealing portion and the second insulating portion are at least partially staggered to each other in the radial direction of the electrode lead-out hole and are at least partially overlapped in the height direction, wherein at least a part of the second sealing portion is located between the second insulating portion and the wall section of the electrode lead-out hole in the radial direction of the electrode lead-out hole and within the space defined by the cylindrical surface.

2. The top cover component according to claim 1, wherein the second insulating portion comprises a covering portion, a surface of the covering portion close to the second sealing portion is substantially parallel to a surface of the second sealing portion close to the second insulating portion, and the surface of the covering portion close to the second sealing portion covers at least a part of the surface of the second sealing portion close to the second insulating portion.

3. The top cover component according to claim 1, wherein a top end of the second insulating portion is higher than a part of an upper surface of the top cover plate in contact with the first sealing portion; or the top end of the second insulating portion is flush with or lower than the part of the upper surface of the top cover plate in contact with the first sealing portion.

4. The top cover component according to claim 1, wherein the terminal plate is located above the first sealing portion and covers the electrode lead-out hole.

5. The top cover component according to claim 1, wherein a lower portion of the second sealing portion is in sealing fit with the lower insulating member such that the second sealing portion and the lower insulating member are in contact and form a seal therebetween.

6. The top cover component according to claim 5, wherein the lower portion of the second sealing portion is in interference fit with the lower insulating member.

7. The top cover component according to claim 5, wherein the lower insulating member further comprises a sealing fit portion; the sealing fit portion protrudes from at least one of an upper surface of the first insulating portion or an upper surface of the second insulating portion, or depresses downward from at least one of the upper surface of the first insulating portion or the upper surface of the second insulating portion; and the lower portion of the second sealing portion is in sealing fit with the sealing fit portion.

8. The top cover component according to claim 7, wherein the sealing fit portion is disposed at a joint of the first insulating portion and the second insulating portion; or, the sealing fit portion is disposed at a top end of the second insulating portion.

9. The top cover component according to claim 7, wherein the sealing fit portion comprises a boss protruding from at least one of the upper surface of the first insulating portion or the upper surface of the second insulating portion, and the longitudinal cross section of the boss is triangular, fan-shaped, trapezoidal or rectangular.

10. The top cover component according to claim 7, wherein a surface of the sealing fit portion in contact with the second sealing portion inclines along a direction from bottom to top toward a direction close to a central axis of the electrode lead-out hole.

11. The top cover component according to claim 10, wherein an included angle between the surface of the sealing fit portion in contact with the second sealing portion and the upper surface of the first insulating portion is in a range of 10-85°.

12. The top cover component according to claim 8, wherein the sealing fit portion is disposed at the top end of the second insulating portion and depresses downward from the upper surface of the second insulating portion.

13. The top cover component according to claim 1, wherein the lower insulating member further comprises a supporting portion supporting the first insulating portion, the supporting portion is located between a lower surface of the first insulating portion and an upper surface of a tab connecting portion of the connecting plate, and the supporting portion is disposed on the lower surface of the first insulating portion and protrudes downward from the lower surface of the first insulating portion.

14. The top cover component according to claim 13, wherein the height of the supporting portion is less than or equal to the distance between the lower surface of the first insulating portion and the upper surface of the tab connecting portion.

15. The top cover component according to claim 13, wherein at least a part of the supporting portion is overlapped with the second sealing portion along the radial direction of the electrode lead-out hole.

16. A secondary battery, comprising the top cover component according to claim 1.

17. The top cover component according to claim 1, wherein there is an interval between a top end of the second insulating portion and a lower surface of the terminal plate.

18. The top cover component according to claim 1, wherein in an axial direction of the electrode lead-out hole, at least part of the sealing member is located between the terminal plate and the top cover plate.

19. The top cover component according to claim 1, wherein the connecting plate comprises a terminal connecting portion, and wherein the terminal connecting portion stretches into the electrode lead-out hole and is electrically connected with the terminal plate.

20. A secondary battery comprising the top cover component according to claim 13, further comprising a connecting plate and the electrode component;

wherein the terminal plate is located at the outside of the electrode lead-out hole and covering the electrode lead-out hole, wherein the connecting plate is disposed between the electrode component and the top cover component, comprises a tab connecting portion and a terminal connecting portion, wherein the tab connecting portion is electrically connected with the tab of the electrode component, wherein the terminal connecting portion is connected with the tab connecting portion and protrudes upward relative to the tab connecting portion, and stretches into the electrode lead-out hole and is in contact with the terminal plate, wherein the terminal connecting portion comprises a convex hull structure with an upward concave groove on the back of the convex hull structure, and wherein in the electrode lead-out hole there is a gap between the convex hull structure and the second insulating portion in the radial direction of the electrode lead-out hole, and the gap is completely within the electrode lead-out hole.

* * * * *